United States Patent
Ghergheli et al.

(10) Patent No.: US 7,686,368 B2
(45) Date of Patent: Mar. 30, 2010

(54) VEHICLE STADIUM/SLIDE SEAT SYSTEM

(75) Inventors: Ioan Ghergheli, Wixom, MI (US); Antonio Buccinna, Livonia, MI (US)

(73) Assignee: Johnson Controls Technology Company, Holland, MI (US)

( * ) Notice: Subject to any disclaimer, the term of this patent is extended or adjusted under 35 U.S.C. 154(b) by 241 days.

(21) Appl. No.: 10/577,747

(22) PCT Filed: Oct. 26, 2004

(86) PCT No.: PCT/US2004/035599

§ 371 (c)(1), (2), (4) Date: Apr. 27, 2006

(87) PCT Pub. No.: WO2005/044616

PCT Pub. Date: May 19, 2005

(65) Prior Publication Data

US 2007/0132266 A1   Jun. 14, 2007

Related U.S. Application Data

(60) Provisional application No. 60/516,477, filed on Oct. 31, 2003.

(51) Int. Cl.
*B60N 2/12* (2006.01)
(52) U.S. Cl. ............... 296/65.13; 296/65.05; 296/65.09
(58) Field of Classification Search ............. 296/65.05, 296/65.09, 65.13, 65.16, 65.01; 297/15, 297/313, 331, 334, 337, 344.1
See application file for complete search history.

(56) References Cited

U.S. PATENT DOCUMENTS

| | | | | |
|---|---|---|---|---|
| 4,880,268 A | * | 11/1989 | Brambilla | 296/65.05 |
| 5,112,109 A | * | 5/1992 | Takada et al. | 297/343 |
| 5,529,378 A | | 6/1996 | Chaban et al. | |
| 5,702,145 A | * | 12/1997 | Fowler et al. | 296/66 |
| 5,711,505 A | * | 1/1998 | Nemoto | 248/424 |
| 6,010,190 A | * | 1/2000 | Downey | 297/340 |
| 6,059,345 A | * | 5/2000 | Yokota | 296/65.14 |
| 6,129,405 A | * | 10/2000 | Miyahara et al. | 296/65.11 |
| 6,152,533 A | | 11/2000 | Smuk et al. | |
| 6,158,799 A | * | 12/2000 | Suilford | 296/65.01 |
| 6,183,033 B1 | * | 2/2001 | Arai et al. | 296/65.09 |
| 6,196,613 B1 | * | 3/2001 | Arai | 296/65.13 |
| 6,250,704 B1 | * | 6/2001 | Garrido | 296/65.05 |
| 6,270,140 B1 | * | 8/2001 | Opfer et al. | 296/65.03 |
| 6,382,491 B1 | * | 5/2002 | Hauser et al. | 296/65.05 |
| 6,435,590 B2 | * | 8/2002 | Miyahara et al. | 296/65.11 |

(Continued)

FOREIGN PATENT DOCUMENTS

DE    195 33 932 A1    3/1997

(Continued)

OTHER PUBLICATIONS

International Search Report for PCT/US2004/035599, date of mailing Nov. 2, 2005, 3 pages.

*Primary Examiner*—Glenn Dayoan
*Assistant Examiner*—Gregory Blankenship
(74) *Attorney, Agent, or Firm*—Butzel Long

(57) ABSTRACT

A system and method to configure the back seats of a passenger vehicle to provide easy vehicle ingress and egress and to configure the back seats for a flat or near flat load (cargo) floor.

13 Claims, 11 Drawing Sheets

U.S. PATENT DOCUMENTS

| | | | |
|---|---|---|---|
| 6,568,756 B2 * | 5/2003 | Sugimoto et al. | 297/335 |
| 6,595,587 B2 * | 7/2003 | Konishi et al. | 297/331 |
| 6,609,745 B2 * | 8/2003 | Miyahara et al. | 296/65.11 |
| 6,669,261 B2 * | 12/2003 | Roberts et al. | 296/65.09 |
| 6,817,646 B2 * | 11/2004 | Kikuchi et al. | 296/65.05 |
| 6,883,868 B2 * | 4/2005 | Yoshida | 297/331 |
| 6,997,498 B2 * | 2/2006 | Oyama | 296/65.05 |
| 7,000,967 B2 * | 2/2006 | Oshima et al. | 296/65.13 |
| 7,077,463 B2 * | 7/2006 | Sun et al. | 297/15 |
| 7,255,384 B2 * | 8/2007 | Saberan et al. | 296/65.09 |
| 7,270,371 B2 * | 9/2007 | Adragna et al. | 297/14 |
| 2001/0001526 A1 | 5/2001 | Moon et al. | |
| 2002/0043850 A1 * | 4/2002 | Sugimoto et al. | 297/344.1 |

FOREIGN PATENT DOCUMENTS

| | | |
|---|---|---|
| DE | 100 47 743 A1 | 4/2002 |
| WO | WO 02/22391 A1 | 3/2002 |
| WO | WO 03/033296 A1 | 4/2003 |

* cited by examiner

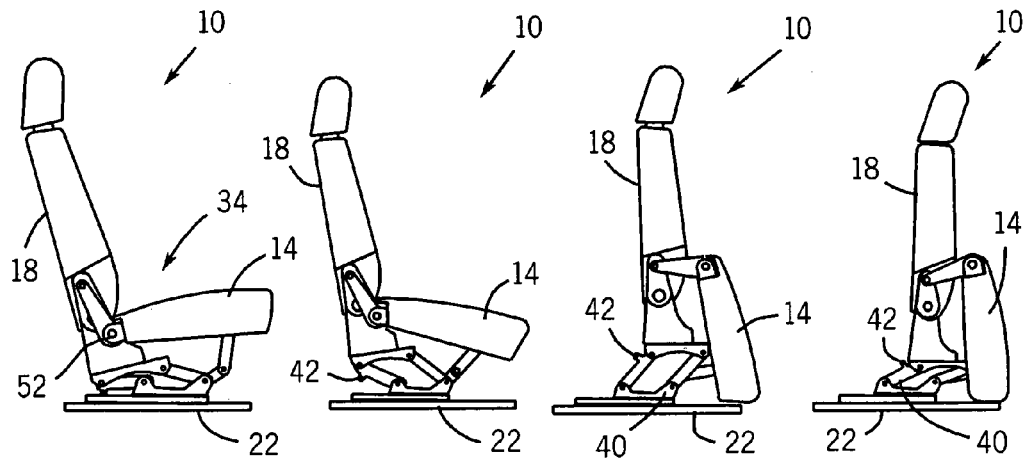
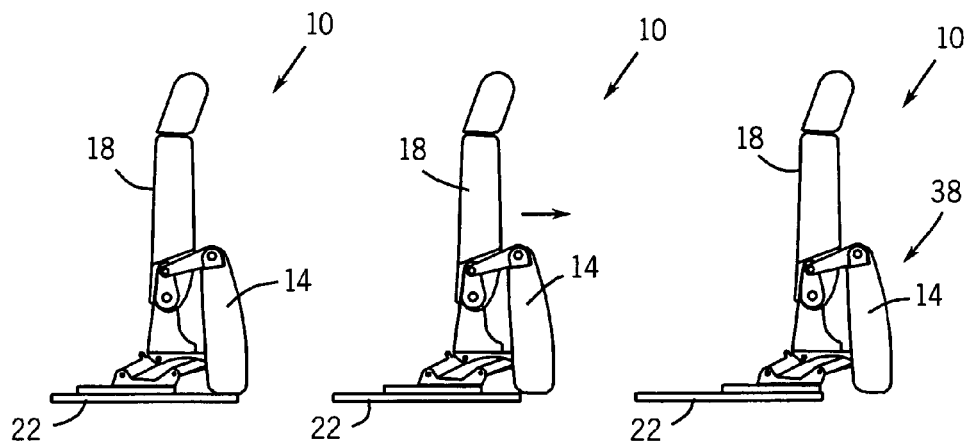

US 7,686,368 B2

VEHICLE STADIUM/SLIDE SEAT SYSTEM

CROSS REFERENCE TO RELATED PATENTS

This application is a PCT international patent application claiming priority based on U.S. Provisional Patent Application 60/516477 filed Oct. 31, 2003 which is incorporated herein by this reference.

FIELD

The present invention relates generally to the field of vehicle seats and more particularly relates to a vehicle stadium/slide seat system, specifically for second and third row automotive seats.

BACKGROUND

It is known to provide a vehicle seat, for example, an automotive seat having a reclining back. It is also known to provide a vehicle seat having a reclining back and an independently movable seat base. It is also known to provide a vehicle seat having a movable seat base that pivots to an upright position. It is also known to provide a vehicle seat that slides from one position to another position along tracks in the vehicle floor.

Notwithstanding the known devices, there remains a significant need to develop a vehicle seat having a seat base and seat back which is capable of pivoting to a flat position to act as a load floor for cargo storage. Further, there remains a need to provide a vehicle seat that includes a seat cushion that can rotate forward to a vertical position and a seat back to release and move forward to allow easy vehicle ingress/egress. Further, there remains a need to provide a vehicle seat having an indicator to notify a user of a predetermined condition of the seat base.

It is desirable to provide a vehicle seat that provides one or more of these or other advantageous features. Other features and advantages will be made apparent from the present description.

SUMMARY

There is provided a system and method to configure the second and third row seats of a passenger vehicle to provide easy vehicle ingress and egress and to configure the second and third row seats for a flat or near flat load (cargo) floor.

There is provided a method for facilitating vehicle ingress and egress with a vehicle including at least one row of back seats coupled to the vehicle in a seat track and having a vehicle stadium/slide seat system, with each seat back having a seat cushion and seat back. The method comprising the steps of manipulating a flip-forward mechanism associated with at least one of the back seats rotating the seat cushion. Moving the back seat in the seat track to a preselected position. The method may also include the step of locking the back seat in the preselected position.

There is also provided a method for facilitating stowing of the back seat of a vehicle having at least one row of back seats coupled to the vehicle in a seat track, with each seat back having a seat cushion and seat back. The method comprising the steps of manipulating a stow lever associated with at least one of the back seats. Rotating the seat back to a position adjacent to the seat cushion. The method may also include the step of rotating the seat back to a design position. The method may also include the step of moving the seat along the seat track to a preselected position. The method may also include the step of locking the seat in the preselected position.

There is further provided a vehicle stadium/slide seat system mounted on one side of the vehicle seat, with the vehicle seat coupled to a vehicle in a seat track and with the vehicle seat having a seat cushion and seat back. The vehicle seat/slide seat system includes a flip-forward mechanism comprising a linkage assembly coupled to the seat track. A seat bracket is coupled to the linkage assembly and the seat cushion. An easy-entry lever is coupled to the linkage assembly and configured to release a track engagement device coupled to the linkage assembly, wherein the vehicle seat can be moved to one of a design position and an easy-entry position. The vehicle stadium/slide seat system also includes a stow lever coupled to the seat back and configured to lock and release the seat back and allow the seat back to rotate to one of a design position and a stowed position. The vehicle stadium/slide seat system can also include a locking device to lock the seat in a position along the seat track.

BRIEF DESCRIPTION OF THE DRAWINGS

FIGS. 14a-g are side views of a second row seat of an exemplary embodiment of a vehicle stadium/slide seat system illustrating the motion of the seat from a design position (14a) to an easy-entry position (14g).

DETAILED DESCRIPTION OF EXEMPLARY EMBODIMENTS

Before beginning the detailed description of an exemplary embodiment, several general comments are warranted about the applicability and the scope of the present invention.

First, the illustrations relate to a seat (also can be referred to as a chair) particularly adapted for motor vehicles, such as cars, SUVs, vans, trucks, buses and the like, but the invention is applicable also to seating used in aircraft, railroad vehicles, nautical vehicles or other environments. The illustrated seat is a back seat of a van or SUV and is also referred to as a stadium seat. The seat typically is located in the second and third rows of a vehicle. The seat may be configured as a bucket seat, split seat or a bench-type seat. The seat can be configured to a 20%, 40% or 60% seat structure.

Second, the seat of the present invention is illustrated in the FIGURE as a padded seat having certain contours, trim and the like. While this configuration is presently preferred, a wide variety of seat configurations and appearances will benefit from use of the mechanical support and movement mechanisms. Also the exterior of the seat can be covered by fabric, vinyl, leather or other materials known and used in the seating art.

Third, with regard to the seat described later herein, substantial modifications can be made without departing from the invention's intended scope. For example, while certain mechanical systems are described to move seat components to achieve certain results, other mechanisms, manual or powered could be substituted therefore. For example, where a screw drive is used in moving the thorax pivot location, other mechanical equivalents including, but not limited to, four bar linkages, air or hydraulic cylinders, air bladders, rack and pinion systems, cams and cables, gears, etc. could be employed. They could be replaced by other known or subsequently developed support mechanisms. These mechanisms do not, in and of themselves, form part of the present invention, but when combined with the other pivot, support, rotation and moving mechanisms define the invention and result in more comfortable seating for the occupant.

Figure 15:
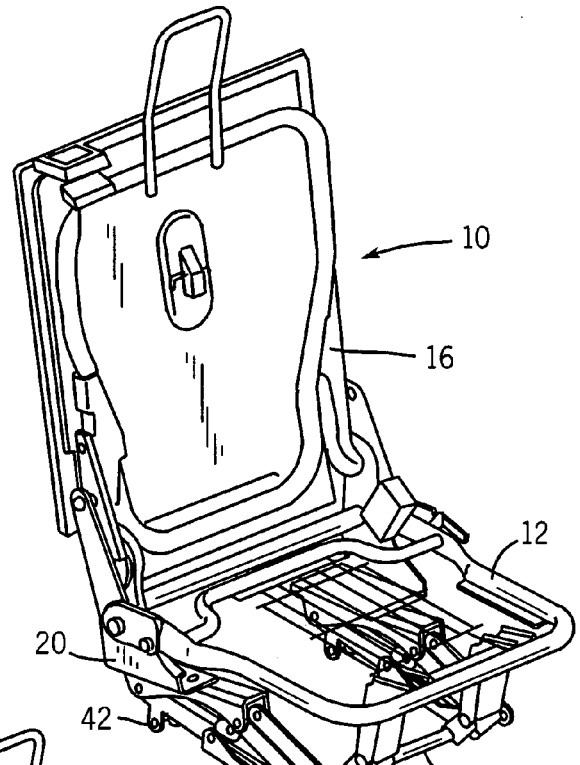
FIG. 15 is a perspective view of an exemplary embodiment of a vehicle seat configured in a 40% seat structure without cushions and illustrating an exemplary embodiment of a flip-forward mechanism and rear track engagement device.
Figure 16:
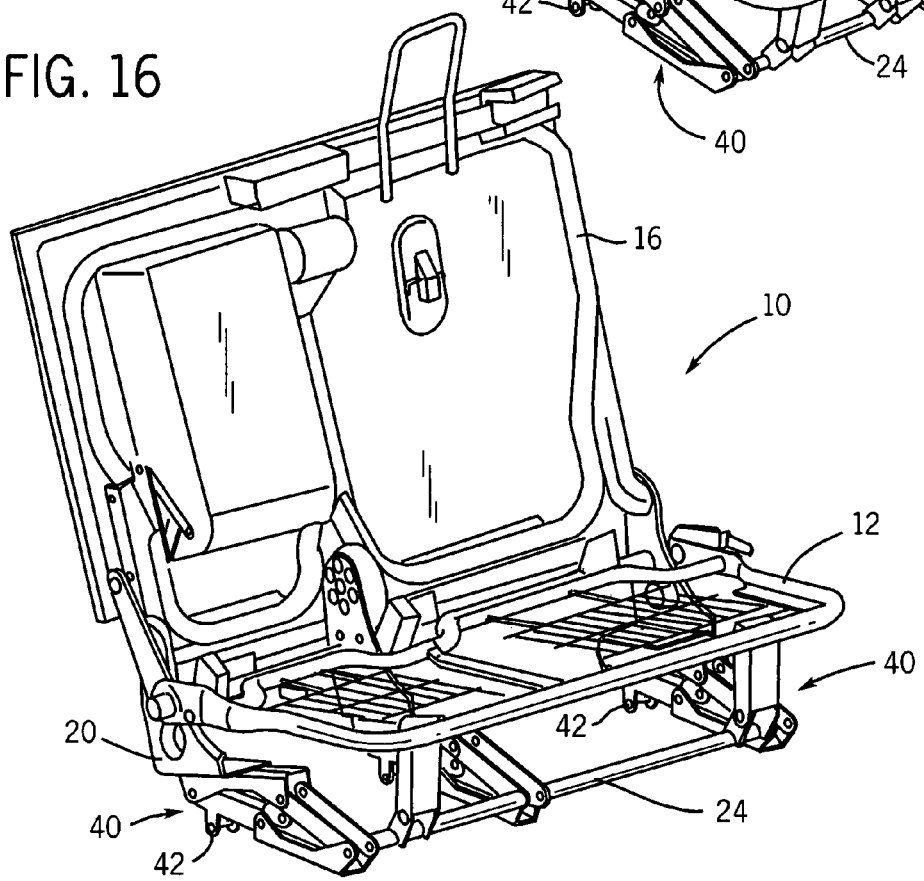
FIG. 16 is a perspective view of an exemplary embodiment of a vehicle seat configured in a 60% seat structure without cushions and illustrating an exemplary embodiment of a flip-forward mechanism and rear track engagement device.
Figure 17:
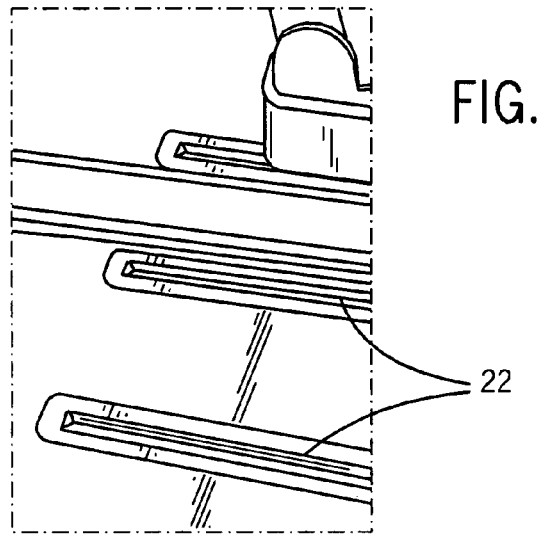
FIG. 17 is an illustration of seat tracks in the floor of a vehicle.
Figure 18:
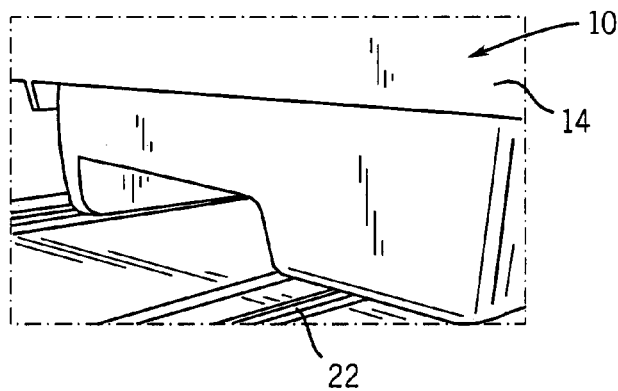
FIG. 18 is an illustration of exemplary embodiment of a non-removable seat mounted in the seat tracks and illustrating the seat-to-track interface.
Figure 19:
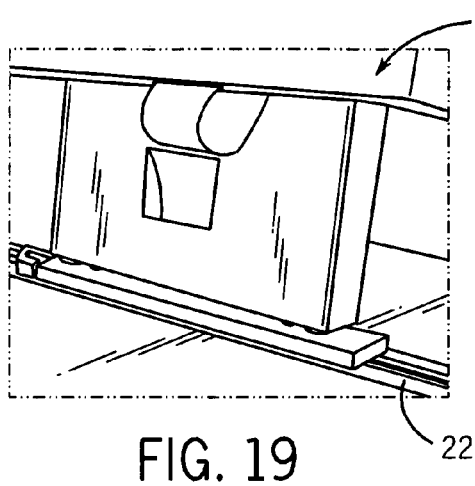
FIG. 19 is an illustration of the removable vehicle seat coupled to a seat track.
Figure 20:
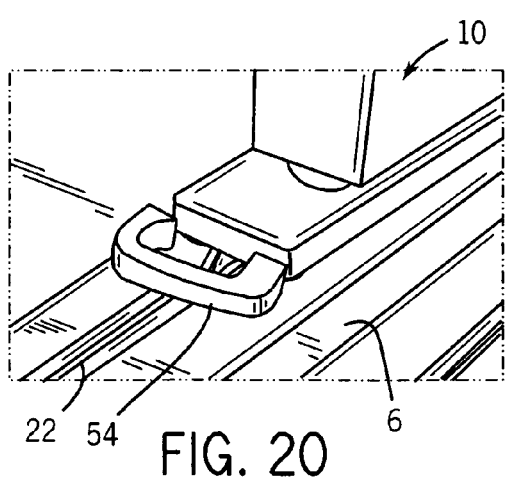
FIG. 20 is an illustration of an exemplary embodiment of a seat release handle to release the seat from a vehicle track.
Figure 21:
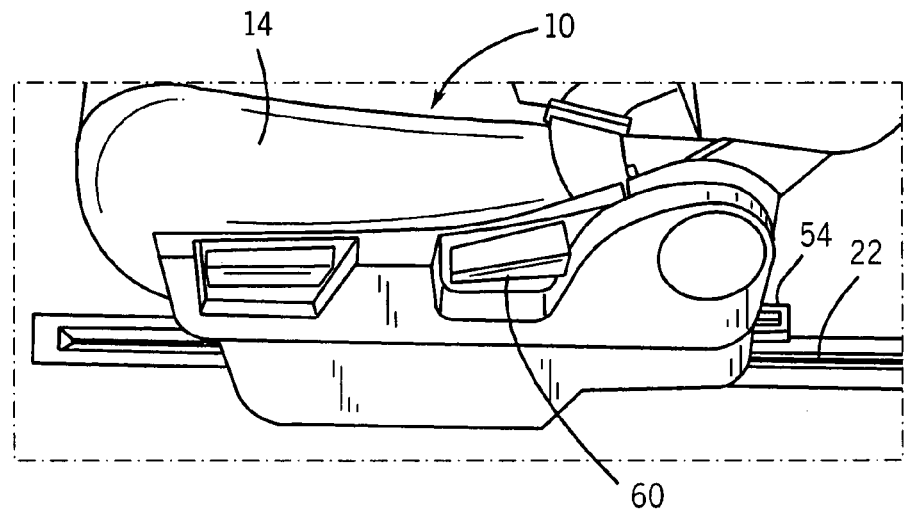
FIG. 21 is an illustration of exemplary embodiment of a vehicle seat coupled to a seat track and illustrating various seat manipulation controls.
Figure 22:
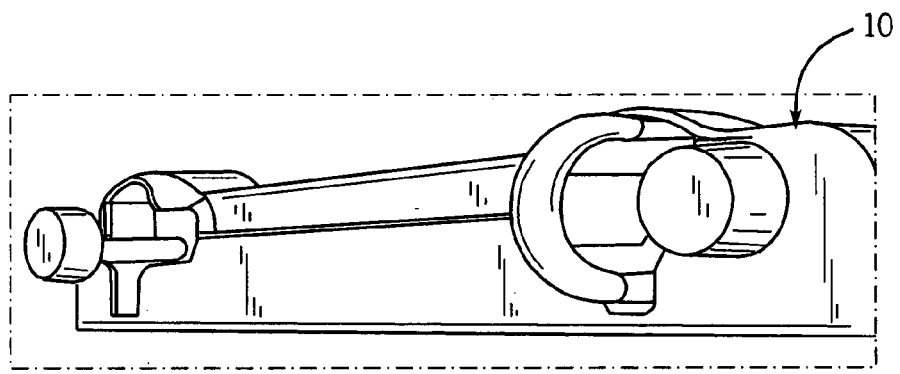
FIG. 22 illustrates an exemplary embodiment of a removable seat attachment mechanism.
Figure 23:
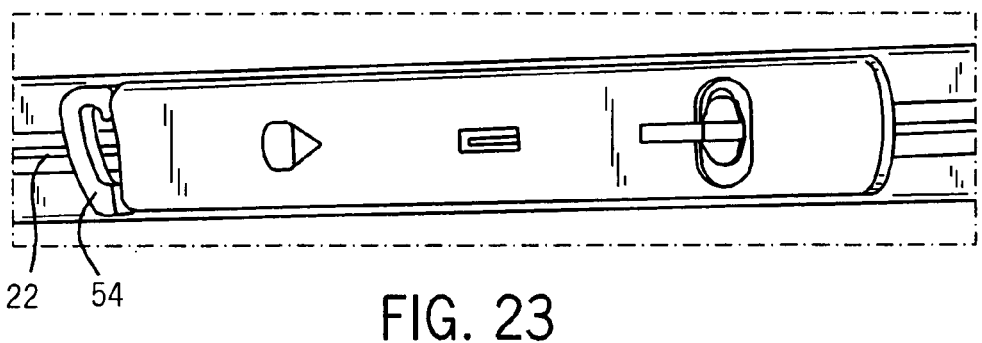
FIG. 23 illustrates an exemplary embodiment of vehicle seat floor attachment features with the vehicle seat removed.

Referring generally to the Figures there is shown a vehicle seat 10 for use in a vehicle 5 of any known type. The vehicle seat 10 includes a seat cushion frame 12 which supports a cushioned seat 14 and a seat back frame 16 supporting a seat back 18. Seat cushion frame 12 and seat back frame 16 are independently pivotally connected to a seat bracket 20 (See FIGS. 15 and 16). The seat 10 can be either a manually adjustable seat or may be provided with electric motors to provide automated adjustment and electronic control of the seat. Such manipulation can be accomplished by the use of a change of position mechanism coupled to the seat back frame 16 and seat cushion frame 12. It is also contemplated that two separate mechanisms may be used to provide flexibility in seat configuration. The change of position mechanism may provide for the seat back frame 16 to move in proportional relation to the seat cushion frame 12 at a predetermined ratio. The seat 10 is connected to the vehicle floor 6 of a vehicle 5 in any of a variety of configurations or designs which allow for the movement and adjustment of the seat 10 within the vehicle 5 for example, seat tracks 22 as illustrated in FIGS. 2, 4-6, 9-10, and 17-21 can be utilized. The vehicle seat 10 may optionally include a headrest which may also be adjustable with respect to an occupant of the seat 10 such as any known or appropriate headrest.

Figure 7:
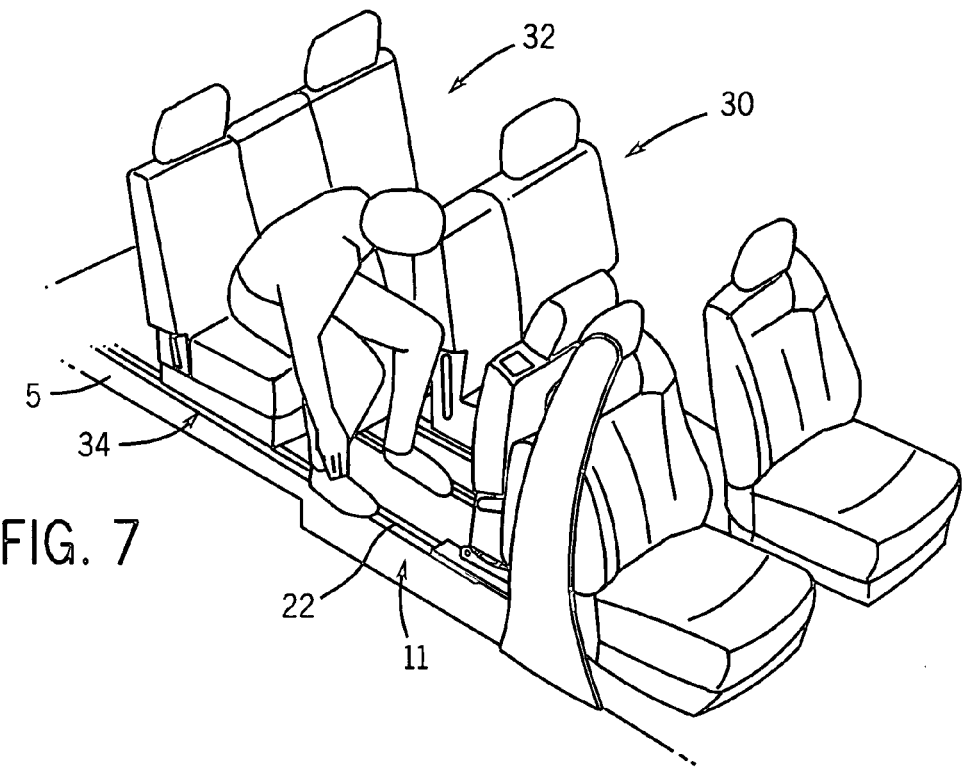
FIG. 7 is a partial perspective front aspect view of a user commencing to exit from a third row seat in a vehicle having a vehicle stadium/slide seat system, with a second row seat in an easy-entry position.
Figure 8:
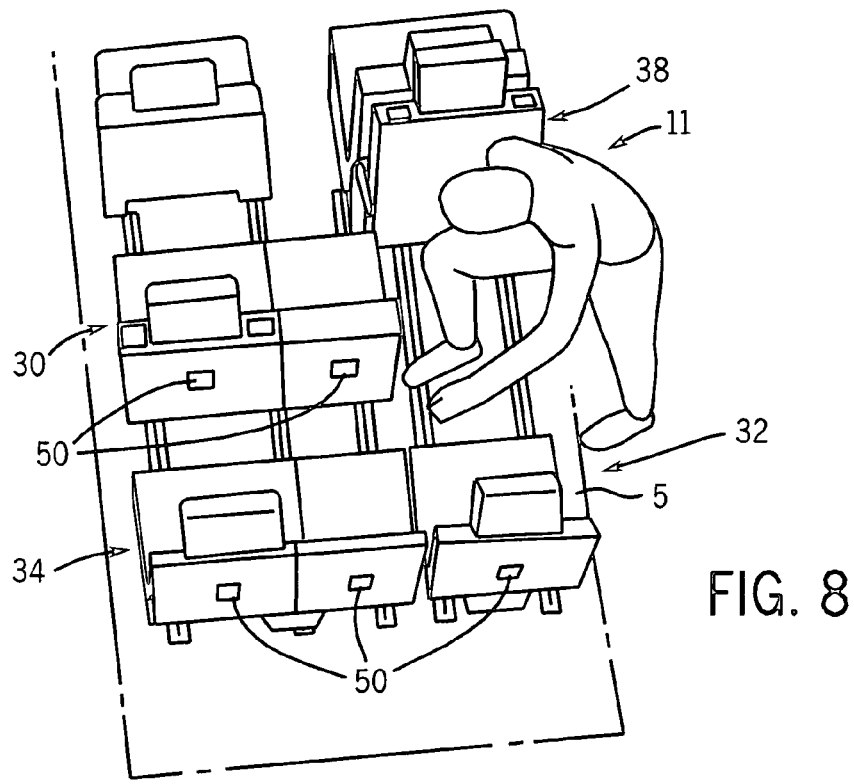
FIG. 8 is a partial perspective rear aspect view of a user commencing to enter a vehicle with a second row seat in an easy-entry position.
Figure 9:
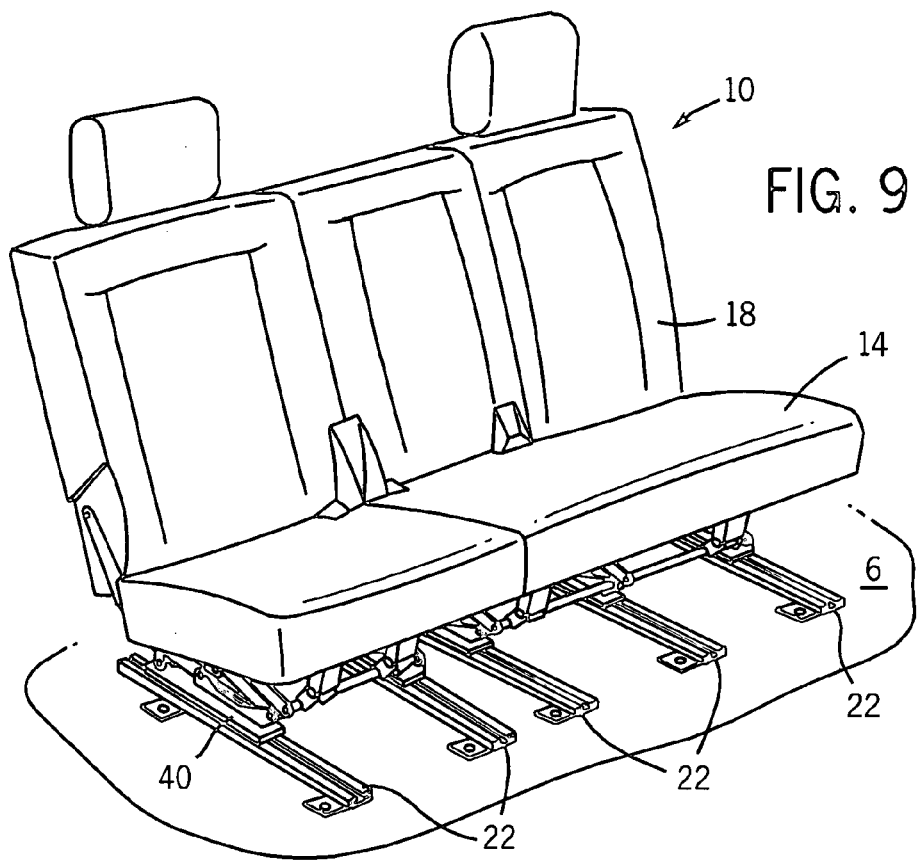
FIG. 9 is an exemplary embodiment of vehicle seats configured in a 60/40% seat structure.
Figure 10:
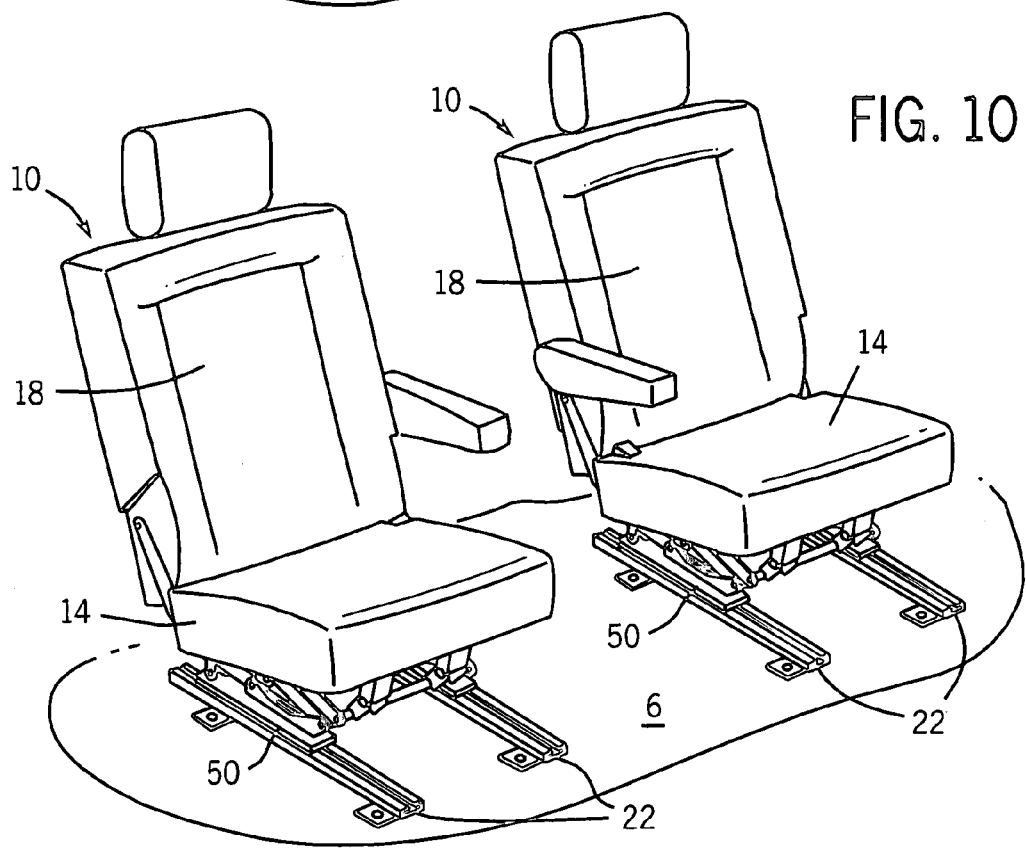
FIG. 10 is an exemplary embodiment of vehicle seats configured in a 40/40% seat structure.
Figure 11:
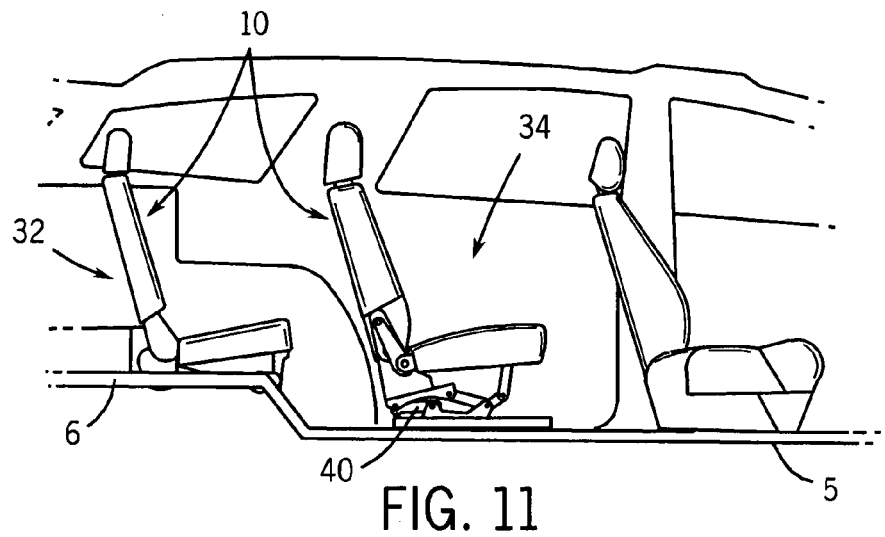
FIG. 11 is a side view of an exemplary embodiment of a second row seat of a vehicle stadium/slide seat system in a design (seating) position.
Figure 12:
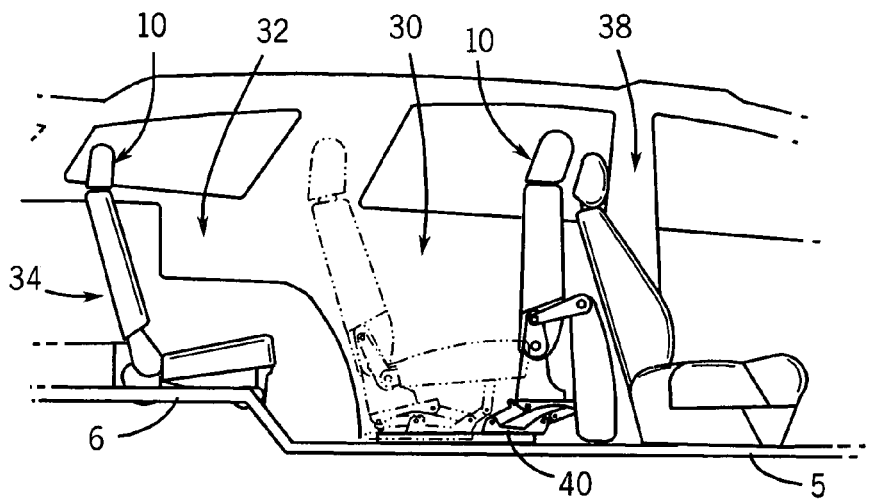
FIG. 12 is a side view of an exemplary embodiment of a second row seat of a vehicle stadium/slide seat system in an easy-entry position and a third row seat in a design position.

Referring to FIGS. 7 and 8, a user can exit the vehicle as shown in FIG. 7 or enter the vehicle as shown in FIG. 8 by activating the vehicle stadium/slide seat system 11. FIGS. 14a through 14g illustrate the movement of the second row 30 seat 10 from the design position 34 to the easy-entry position 38. The user rotates or pulls the easy-entry lever 52 located on the side of the seat 10 and lifting the seat cushion 14 upward. It should be understood that a biasing device or a motorized device can facilitate such seat cushion 14 movement. The seat cushion 14 and seat cushion frame 12 unlatches and rotates forward. The seat back 18 and seat back frame 16 will articulate forward at approximately the same time as the seat cushion 14 is moving. In an exemplary embodiment of a vehicle stadium/slide seat system 11, the seat back 14 will articulate approximately 200 mm. The complete seat 10 can then be slid forward in the seat track 22 towards the front of the vehicle 5 to the easy-entry position 38. Exemplary embodiments of the vehicle stadium/slide seat system 11 can provide for the seat 10 forward movement of approximately 200 to 400 mm of total travel distance.

To return the stadium seat 10 to its design position 34, the user will grasp the release handle 52 to relocate the seat 10 from the full forward position and pull rearward. The seat cushion 14 will return to its design position 34 and the rear track engagement device 42 of the seat 10 will relatch in the seat track 22 in the full forward seating position.

An occupant in the third row seats 32 can activate the stadium seat 10 in the second row 30 by reaching to the side of the seat 10 and rotating the easy-entry lever 52 as described above and push the seat 10 forward to the easy-entry position 38.

The movement of the stadium seat 10 as described above is facilitated by a flip-forward mechanism 40 which is coupled to a seat bracket 20. A flip-forward mechanism 40 is mounted on each side of the seat 10. (See. FIGS. 9, 10 and 15, 16.) A rear track engagement device 42 is coupled to the flip-forward mechanism 40 and engages the seat track 22. During the movement of the seat 10 from the design position 34 to the easy-entry position 38, the rear track engagement device 42 releases from the seat track 22 which allows the seat back 18 to articulate forward as described above. In the movement from the easy-entry position 38 back to the design position 34 as described above, the rear track engagement device 42 will re-engage with the track 22. Additional features of the seat track 22 and seat 10 interface are illustrated in FIGS. 17-23.

Figure 1:
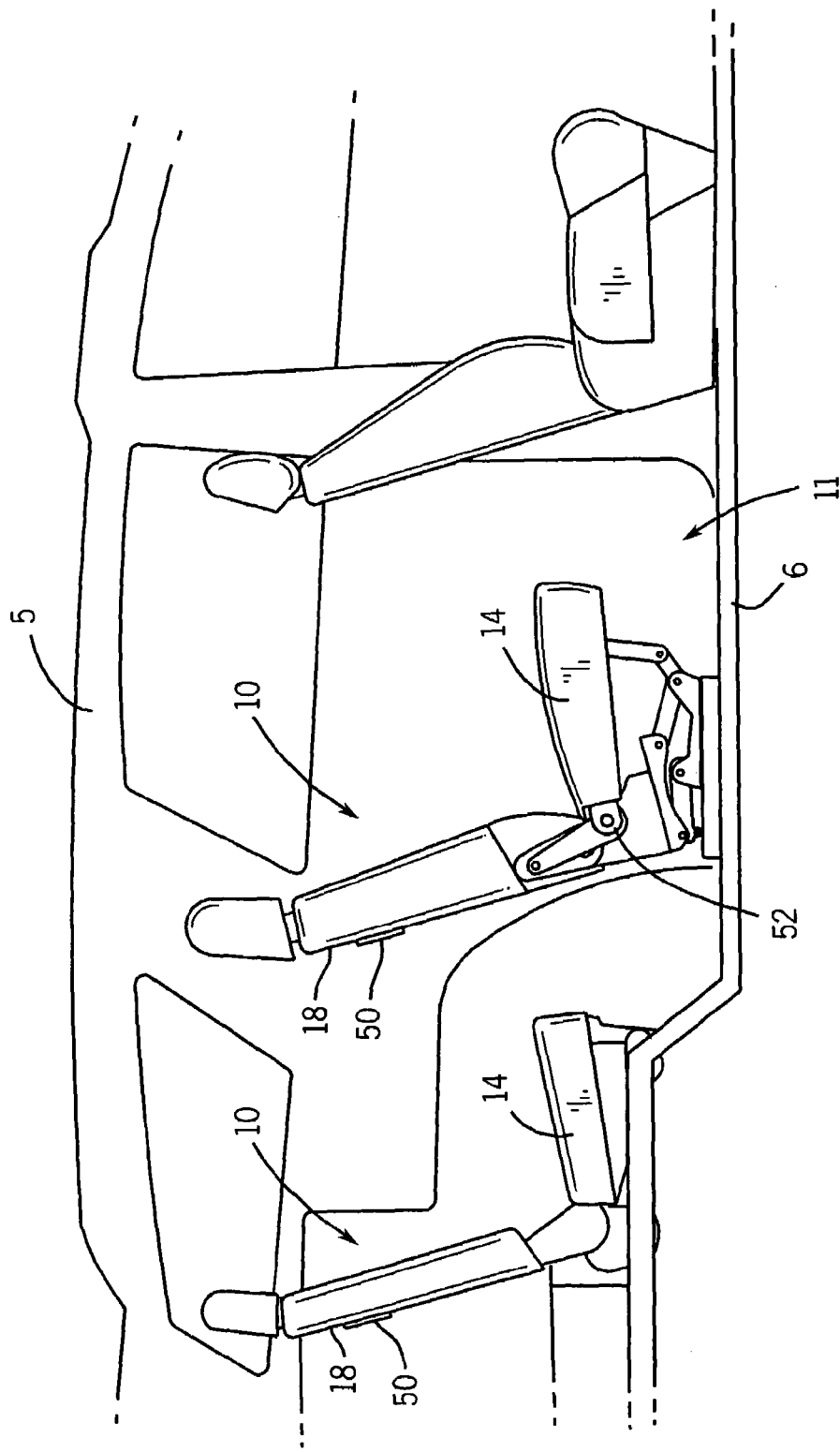
FIG. 1 is a partial side sectional view of a vehicle interior including an exemplary embodiment of a vehicle stadium/slide seat system for second and third row seats.
Figure 2:
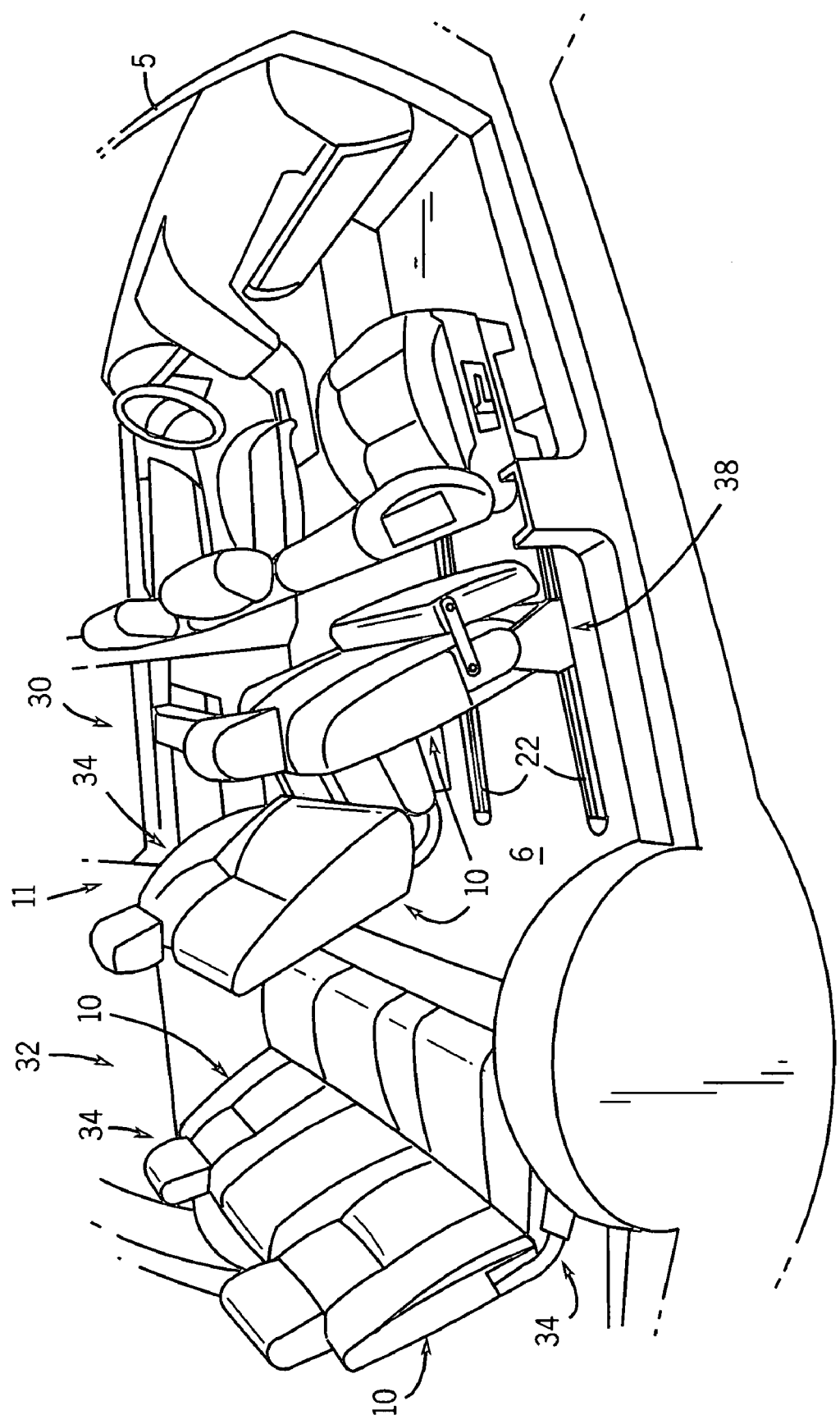
FIG. 2 is a partial perspective view of a vehicle interior including an exemplary embodiment of a vehicle stadium/slide seat system, with one seat in an easy-entry position.
Figure 3:
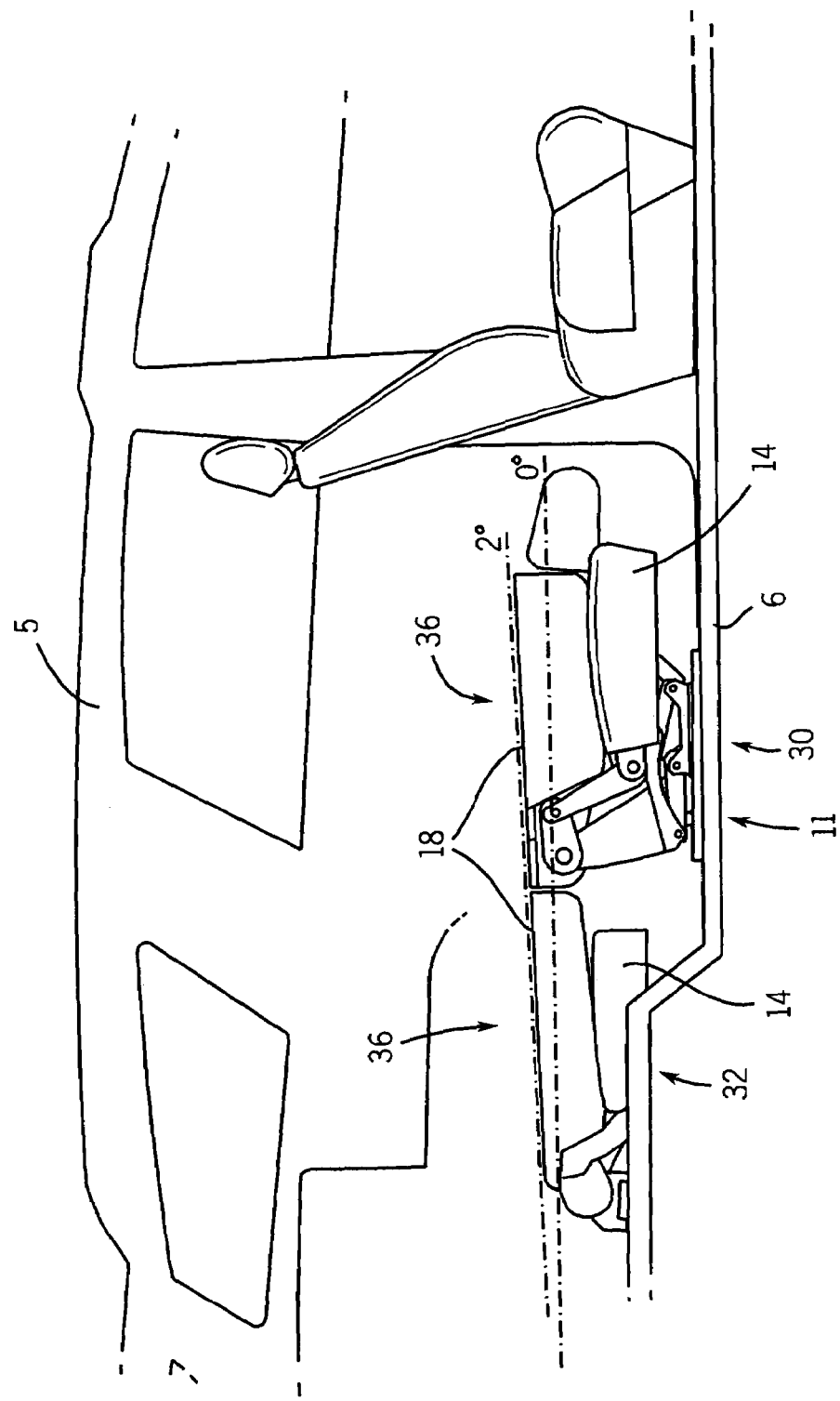
FIG. 3 is a partial side sectional view of a vehicle interior including an exemplary embodiment of a vehicle stadium/slide seat system with second and third row seats in a stowed position.
Figure 4:
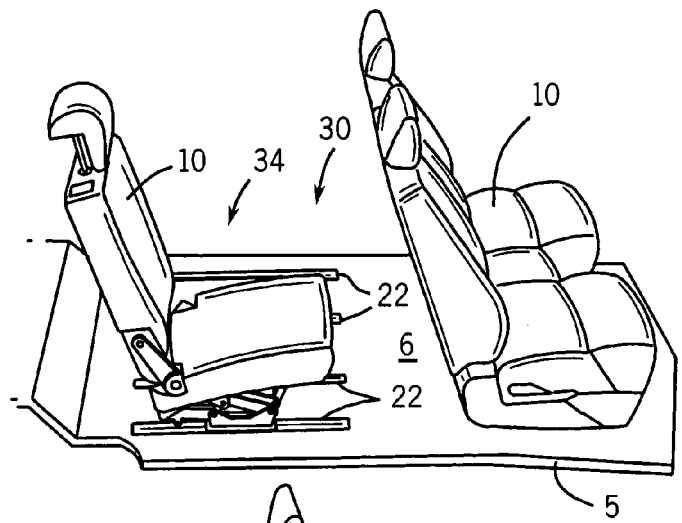
FIG. 4 is a partial perspective view of a second row seat of an exemplary embodiment of a vehicle stadium/slide seat system in a design (seating) position.
Figure 5:
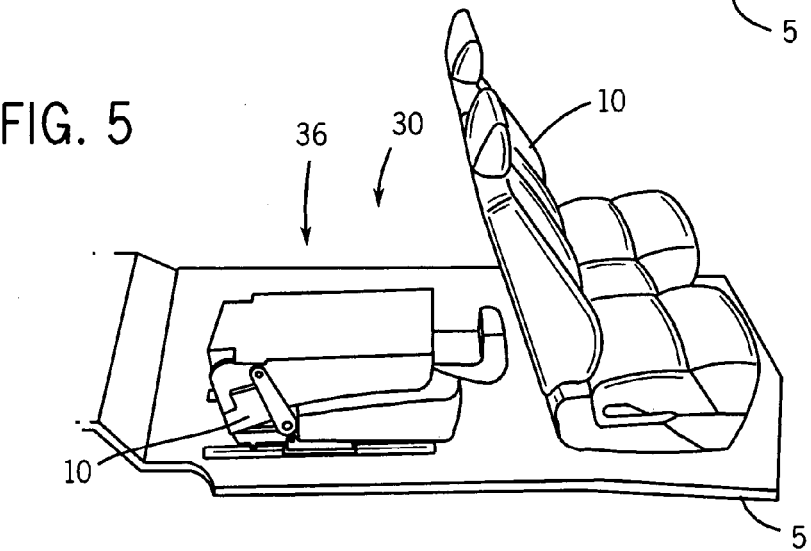
FIG. 5 is a partial perspective view of a second row seat of an exemplary embodiment of a vehicle stadium/slide seat system in a stow position.
Figure 6:
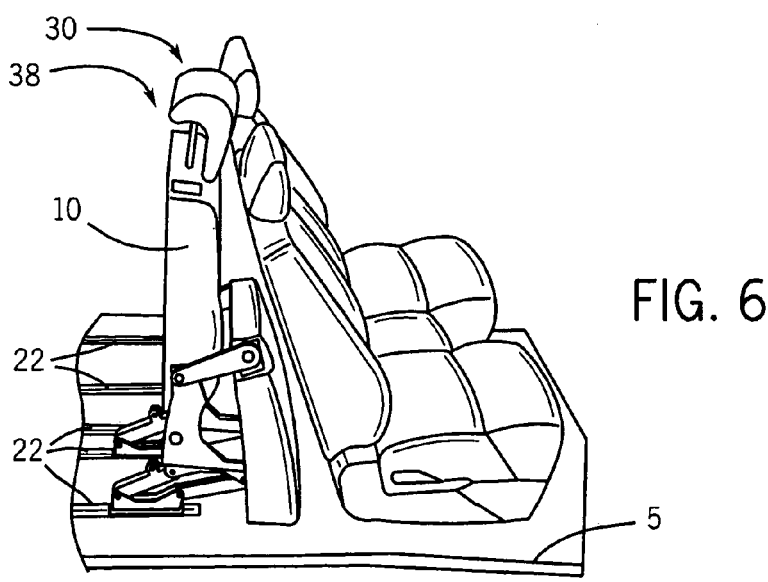
FIG. 6 is a partial perspective view of a second row seat of an exemplary embodiment of a vehicle stadium/slide seat system in an easy-entry position.
Figure 13:
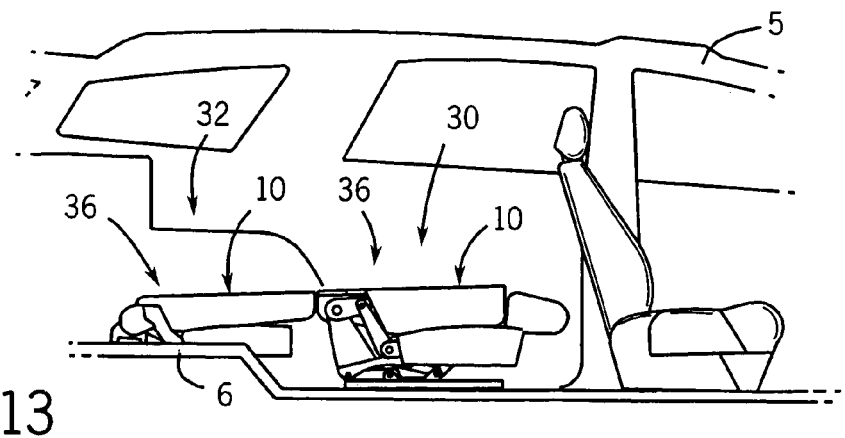
FIG. 13 is a side view of an exemplary embodiment of a second row seat of a vehicle stadium/slide seat system in a stowed position and a third row seat in a stowed position.

Another feature of the vehicle stadium/slide seat system 11 is the ability of the second and third row seats 30, 32 to assume a stow flat configuration 36. To activate the stow flat position 36, a stow lever 50 is pulled to unlock the seat back 18 and rotate the seat back 18 forward as shown in FIGS. 3, 5 and 13. The seat cushion 14 will stow forward as the seat back 18 rotates to a down position as shown in FIGS. 3, 5 and 13. Such operation is performed on the seats of the second row 30 and the third row seats 32 as shown in FIG. 3. The second row seat 30 can be pushed back to a full rear position to close any gap between the second row 30 and third row seats 32. It should be noted by sliding the second row seat 30 to the most rearward position eliminates the need of a flipper panel between the second and third row seats.

To position the seats 10 from a stowed flat position 36 to the design position 34, the stow lever 52 is pulled to unlock the seat back 18 from the down position and lift the seat back 18 up. The seat cushion 14 will return to the seating or design position 34. The seat 10 can then be moved along the seat track 22 fore or aft as desired by an occupant.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature Although the disclosed embodiments have been described in some detail, it should be understood that various changes, substitutions and alterations can be made to the embodiments without departing from their spirit and scope.

We claim:

1. A method of reconfiguring a vehicle seat for facilitating ingress and egress in a vehicle, the vehicle seat including a seat back that may be pivotably adjusted, a seat cushion pivotably coupled to the seat back, a track assembly, and a linkage assembly, the vehicle seat being slidably movable along the track assembly in a first direction, the method comprising the steps of:
   unlatching the seat cushion;
   sliding the vehicle seat in the first direction; and
   moving the seat cushion from a first position wherein the seat cushion is substantially perpendicular to the seat back to a second position wherein the rear of the seat cushion is adjacent to the seat back and positioned above the front of the seat cushion and the seat cushion is aligned with respect to the seat back.

2. The method of claim 1, wherein the first position is an easy-entry position and the second position is a design position.

3. The method of claim 1, including the step of locking the seat in the second position.

4. A method for facilitating stowing of a non-first row seat of a vehicle having at least one row of non-first row seats coupled to the vehicle in a seat track, with each non-first row seat having a seat cushion pivotably coupled to a seat back, the method comprising the steps of:
   manipulating a lever associated with the non-first row seat to stow the non-first row seat;
   moving the seat cushion forward and downward about a pivotal connection between the seat cushion and the seat back such that the seat cushion is closer to the vehicle floor; and
   rotating the seat back to a position adjacent to the seat cushion.

5. The method of claim 4, including the step of rotating the seat back to a design position.

6. The method of claim 4, including the step of moving the seat along the seat track to a pre-selected position.

7. The method of claim 6, including the step of locking the seat in the pre-selected position.

8. A seat system for mounting in a vehicle, seat system having a seat track, a seat cushion and a seat back, the seat system comprising:
   a first mechanism for adjusting the seat cushion between a design position for sitting and a easy-entry position where the seat cushion is flipped forward comprising:
   a linkage assembly coupled to the seat track;
   a seat bracket coupled to the linkage assembly and the seat cushion;
   and
   an easy-entry adjuster coupled to the linkage assembly and configured to release a track engagement device coupled to the linkage assembly, wherein the vehicle seat can be moved to one of a design position and an easy-entry position while maintaining the seat back in an upright position; and
   a stow adjuster coupled to the seat and configured to lock and release the seat cushion and allow the seat cushion to move to one of a design position and a stowed position wherein the seat cushion is flush with the vehicle floor.

9. The seat system of claim 8, wherein the seat system is operable from either side of the vehicle seat.

10. The seat system of claim 8, including a locking device to lock the seat in a position along the seat track.

11. The seat system of claim 8, further comprising:
   a lever associated with the non-first row seat configured to lock and release the seat cushion and seat back and allow the seat cushion and seat back to move to one of a design position or stowed position wherein the seat cushion is closer to the vehicle floor and the seat back is positioned adjacent to the seat cushion.

12. A method for facilitating vehicle ingress and egress with a vehicle including at least one non-first row seat coupled to the vehicle in a seat track and having a seat cushion pivotably coupled to a seat back, the method comprising the steps of:
   manipulating a first mechanism of the non-first row seat for adjusting a seat cushion to flip forward;
   rotating the seat cushion about a pivotal connection between the seat cushion and the seat back; and
   moving the non-first row seat in the seat track to a pre-selected position after rotating the seat cushion.

13. A vehicle seat for facilitating vehicle ingress and egress in a vehicle, the vehicle seat including:
   a seat back that may be pivotably adjusted;
   a seat cushion that may be pivotably adjusted;
   wherein the seat cushion is pivotably coupled to the seat back such that the seat cushion may be flipped forward;
   a track assembly;
   the vehicle seat being slidably movable along the track assembly in a first and second direction; and
   a linkage assembly having a first end pivotably coupled to the rear of the seat cushion and a second end pivotably coupled to the seat back.

* * * * *